US009581633B2

(12) United States Patent
Muto

(10) Patent No.: US 9,581,633 B2
(45) Date of Patent: Feb. 28, 2017

(54) RELATIVE ANGLE DETECTION APPARATUS AND ELECTRIC POWER STEERING APPARATUS

(71) Applicant: Showa Corporation, Gyoda (JP)

(72) Inventor: Hiroyuki Muto, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 117 days.

(21) Appl. No.: 14/380,626

(22) PCT Filed: Oct. 30, 2012

(86) PCT No.: PCT/JP2012/077946
§ 371 (c)(1),
(2) Date: Aug. 22, 2014

(87) PCT Pub. No.: WO2013/145400
PCT Pub. Date: Oct. 3, 2013

(65) Prior Publication Data
US 2015/0015270 A1 Jan. 15, 2015

(30) Foreign Application Priority Data
Mar. 30, 2012 (JP) ................................. 2012-082734

(51) Int. Cl.
*G01R 31/02* (2006.01)
*B62D 6/10* (2006.01)
(Continued)

(52) U.S. Cl.
CPC ........... *G01R 31/025* (2013.01); *B62D 5/049* (2013.01); *B62D 6/10* (2013.01); *G01B 7/30* (2013.01);
(Continued)

(58) Field of Classification Search
None
See application file for complete search history.

(56) References Cited

U.S. PATENT DOCUMENTS 5,200,711 A * 4/1993 Andersson ............ H03F 1/0227
330/267
2003/0040872 A1 2/2003 Ueno
(Continued)

FOREIGN PATENT DOCUMENTS

CN 1178054 C 12/2004
CN 101666710 A 3/2010
(Continued)

OTHER PUBLICATIONS

Machine Translation of JP2009255645.*
(Continued)

*Primary Examiner* — Jermele M Hollington
*Assistant Examiner* — Douglas X Rodriguez
(74) *Attorney, Agent, or Firm* — Leason Ellis LLP

(57) ABSTRACT

A relative angle detection apparatus includes a first magnetometric sensor and a first voltage amplifier that output a signal corresponding to a relative rotation angle between a first rotation shaft and a second rotation shaft; a first amplifier circuit that amplifies the output signal of the first voltage amplifier; a second magnetometric sensor and a second voltage amplifier that output a signal that corresponds to the relative rotation angle; a second amplifier circuit that amplifies the output signal of the second voltage amplifier; a first resistor that is provided between the first amplifier circuit and a power supply terminal, or between the first amplifier circuit and a GND terminal; and a second resistor that is provided between the second amplifier circuit and the power supply terminal, or between the second amplifier circuit and the GND terminal.

6 Claims, 16 Drawing Sheets

(51) Int. Cl.
  *G01L 11/02* (2006.01)
  *G01L 25/00* (2006.01)
  *G01M 13/02* (2006.01)
  *G01L 3/10* (2006.01)
  *B62D 5/04* (2006.01)
  *G01B 7/30* (2006.01)
  *G01D 5/14* (2006.01)
  *G01D 5/245* (2006.01)

(52) U.S. Cl.
  CPC ............ *G01L 3/101* (2013.01); *G01L 11/025* (2013.01); *G01L 25/003* (2013.01); *G01M 13/02* (2013.01); *G01D 5/145* (2013.01); *G01D 5/2451* (2013.01)

(56) References Cited

U.S. PATENT DOCUMENTS

| | | |
|---|---|---|
| 2004/0017206 A1 | 1/2004 | Ura |
| 2010/0201373 A1 | 8/2010 | Sato et al. |
| 2011/0106469 A1 | 5/2011 | Kim et al. |

FOREIGN PATENT DOCUMENTS

| | | |
|---|---|---|
| CN | 101833049 A | 9/2010 |
| EP | 1357351 A | 10/2003 |
| JP | 2003-065876 A | 3/2003 |
| JP | 2003-315181 A | 11/2003 |
| JP | 2005-331453 A | 12/2005 |
| JP | 2009-255645 A | 11/2009 |
| JP | 2010-203903 A | 9/2010 |
| JP | 2011-099842 A | 5/2011 |

OTHER PUBLICATIONS

International Search Report mailed Jan. 8, 2013 for the corresponding PCT Application No. PCT/JP2012/077946.

Office Action mailed Jul. 31, 2015 for the corresponding Chinese Application No. 201280070891.7.

Office Action mailed Jun. 19, 2015 for the corresponding Japanese Application No. 2012-082734.

* cited by examiner

FIG. 13
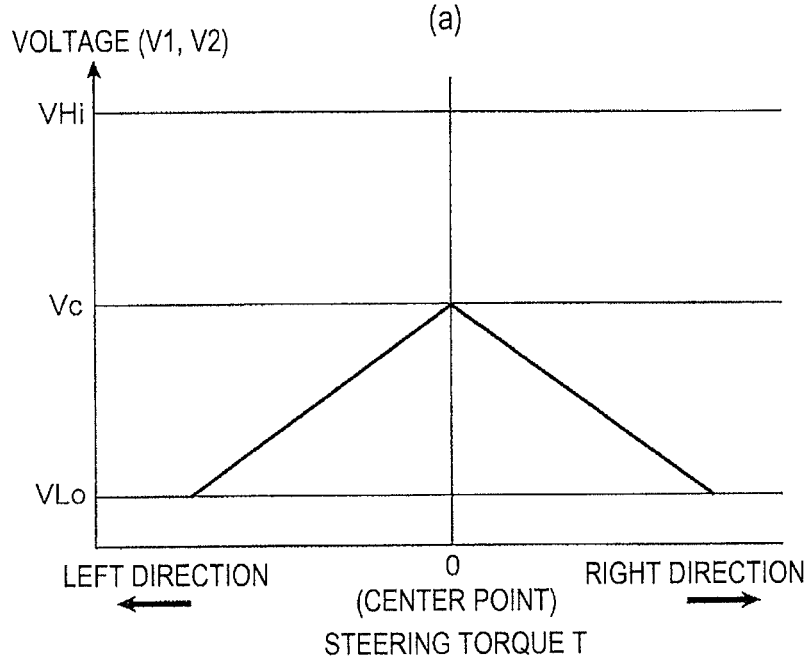
(a)
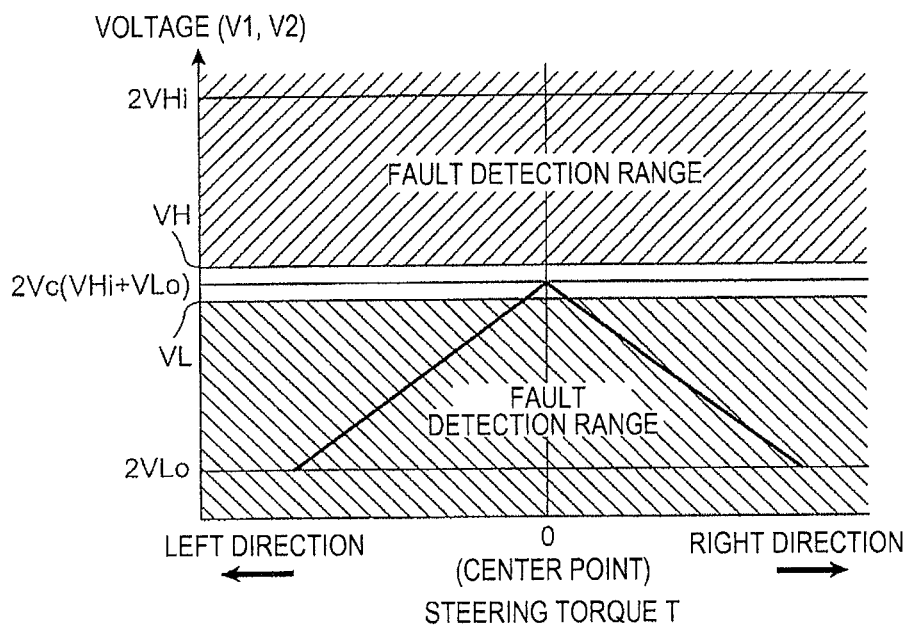
(b)

FIG. 15
(a)
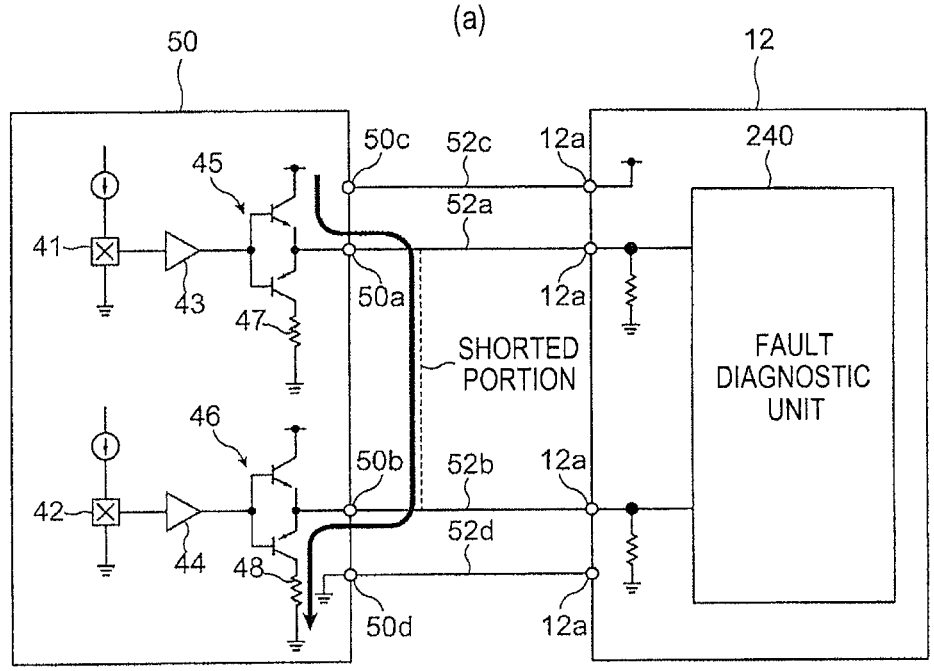
(b)
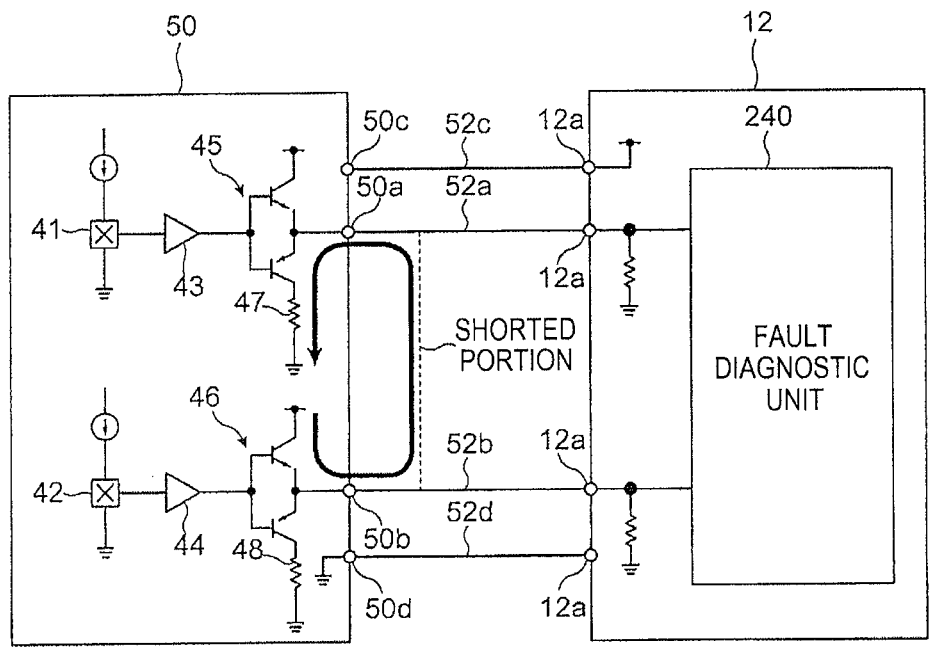

FIG. 16
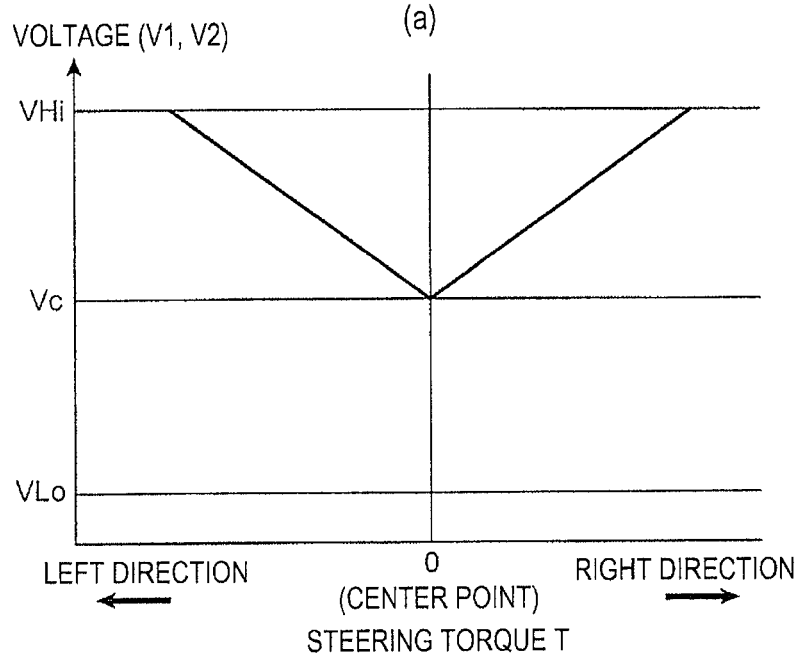
(a)
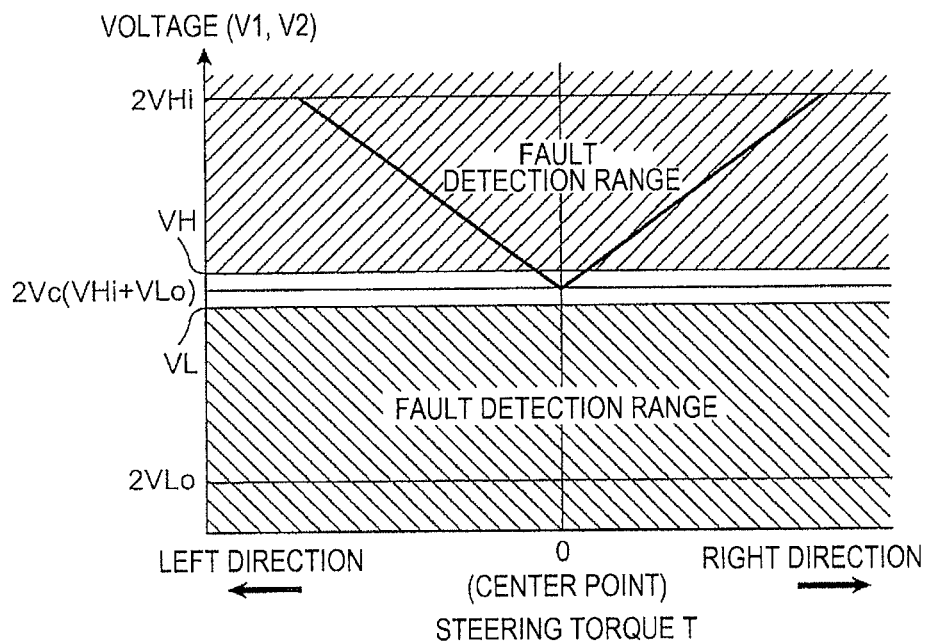
(b)

RELATIVE ANGLE DETECTION APPARATUS AND ELECTRIC POWER STEERING APPARATUS

CROSS-REFERENCE TO RELATED PATENT APPLICATIONS

This application is a U.S. National Phase Application under 35 U.S.C. §371 of International Patent Application No. PCT/JP2012/077946, filed Oct. 30, 2012, and claims the benefit of Japanese Patent Application No. 2012-082734, filed on Mar. 30, 2012, all of which are incorporated by reference in their entirety herein. The International Application was published in Japanese on Oct. 3, 2013 as International Publication No. WO/2013/145400, under PCT Article 21(2).

FIELD OF THE INVENTION

The present invention relates to a relative angle detection apparatus and an electric power steering apparatus.

BACKGROUND OF THE INVENTION

The related art proposes a technology in which an electric power steering apparatus includes a torque sensor (a relative angle detection apparatus), and an electric motor is controlled based on a value detected by the torque sensor.

For example, the torque sensor disclosed in JP-A-2009-255645 has the following configuration. That is, the torque sensor is configured to have a torsion bar that coaxially connects an input shaft and an output shaft; a ring-shaped magnet that is attached to an end portion of the input shaft; a pair of magnetic yokes that are attached to an end portion of the output shaft; and a magnetometric sensor that detects magnetic flux density occurring in the magnetic yokes.

Technical Problem

A configuration is adopted in which multiplexing by the use of two magnetometric sensors improves reliability, and monitoring the sum of respective output voltages of the two magnetometric sensors with output characteristics, which are contradictory to each other, enables a fault of the magnetometric sensors to be detected. At this time, a short circuit fault occurring across signal lines for transmitting the output values of the two magnetometric sensors can be desirably detected.

An object of the present invention is to provide a relative angle detection apparatus and an electric power steering apparatus which can detect a short circuit fault occurring across signal lines.

SUMMARY OF THE INVENTION

Solution to Problem

For the object, the present invention relates to a relative angle detection apparatus characterized by including first output means for outputting a signal that corresponds to a relative rotation angle between two rotation shafts that are coaxially disposed; a first amplifier circuit that is obtained by combining together circuits operating reversely to each other, and amplifies the output signal of the first output means; second output means for outputting a signal that corresponds to the relative rotation angle, and has characteristics contradictory to those of the output signal of the first output means; a second amplifier circuit that is obtained by combining together circuits operating reversely to each other, and amplifies the output signal of the second output means; abnormality detection means for detecting abnormality of a first signal or a second signal based on the first signal output from the first amplifier circuit and the second signal output from the second amplifier circuit; a first resistor that is provided between the first amplifier circuit and a power supply terminal which receives a power supply voltage, or between the first amplifier circuit and a reference terminal which receives a reference voltage; and a second resistor that is provided between the second amplifier circuit and the power supply terminal receiving a power supply voltage, or between the second amplifier circuit and the reference terminal which receives a reference voltage, and at a location that corresponds to the location in which the first resistor is provided.

Herein, each of the first amplifier circuit and the second amplifier circuit preferably is a push-pull circuit.

When the sum of the value of the first signal and the value of the second signal is outside of a predetermined range, the abnormality detection means preferably determines an occurrence of abnormality.

Each of the first output means and the second output means preferably has a Hall element that outputs a voltage signal corresponding to the relative rotation angle between the two rotation shafts, and a voltage amplifier circuit that amplifies the voltage signal output from the Hall element.

According to another aspect, the present invention relates to an electric power steering apparatus characterized by including first output means for outputting a signal that corresponds to a relative rotation angle between two rotation shafts that are coaxially disposed; a first amplifier circuit that is obtained by combining together circuits operating reversely to each other, and amplifies the output signal of the first output means; second output means for outputting a signal that corresponds to the relative rotation angle, and has characteristics contradictory to those of the output signal of the first output means; a second amplifier circuit that is obtained by combining together circuits operating reversely to each other, and amplifies the output signal of the second output means; abnormality detection means for detecting abnormality of a first signal or a second signal based on the first signal output from the first amplifier circuit and the second signal output from the second amplifier circuit; a first resistor that is provided between the first amplifier circuit and a power supply terminal which receives a power supply voltage, or between the first amplifier circuit and a reference terminal which receives a reference voltage; and a second resistor that is provided between the second amplifier circuit and the power supply terminal receiving a power supply voltage, or between the second amplifier circuit and the reference terminal, and at a location that corresponds to the location in which the first resistor is provided.

Advantageous Effects of Invention

According to the present invention, it is possible to detect a short circuit fault occurring across signal lines for transmitting the values of respective signals output from a plurality of the output means based on the relative rotation angle of two rotation shafts that are coaxially disposed.

BRIEF DESCRIPTION OF THE DRAWINGS

FIG. 13 includes Part (a) is a graph illustrating a first voltage of a first voltage signal output from the first amplifier circuit, and a second voltage of a second voltage signal output from the second amplifier circuit when the signal lines are shorted to each other and Part (b) is a graph illustrating a sum voltage which is the sum of the first voltage and the second voltage when the signal lines are shorted to each other.

FIG. 15 shows circuit diagrams illustrating current flows when signal lines are shorted to each other, and includes Part (a) is a circuit diagram illustrating a current flow when a steering torque is positive, and Part (b) is a circuit diagram illustrating a current flow when a steering torque is negative.

FIG. 16 includes Part (a) is a graph illustrating a first voltage of a first voltage signal output from a first amplifier circuit, and a second voltage of a second voltage signal output from a second amplifier circuit when the signal lines are shorted to each other and Part (b) is a graph illustrating a sum voltage, which is the sum of the first voltage and the second voltage, when the signal lines are shorted to each other.

DETAILED DESCRIPTION OF THE INVENTION

Hereinafter, preferred embodiments of the present invention will be described in detail with reference to the accompanying drawings.

Figure 1:
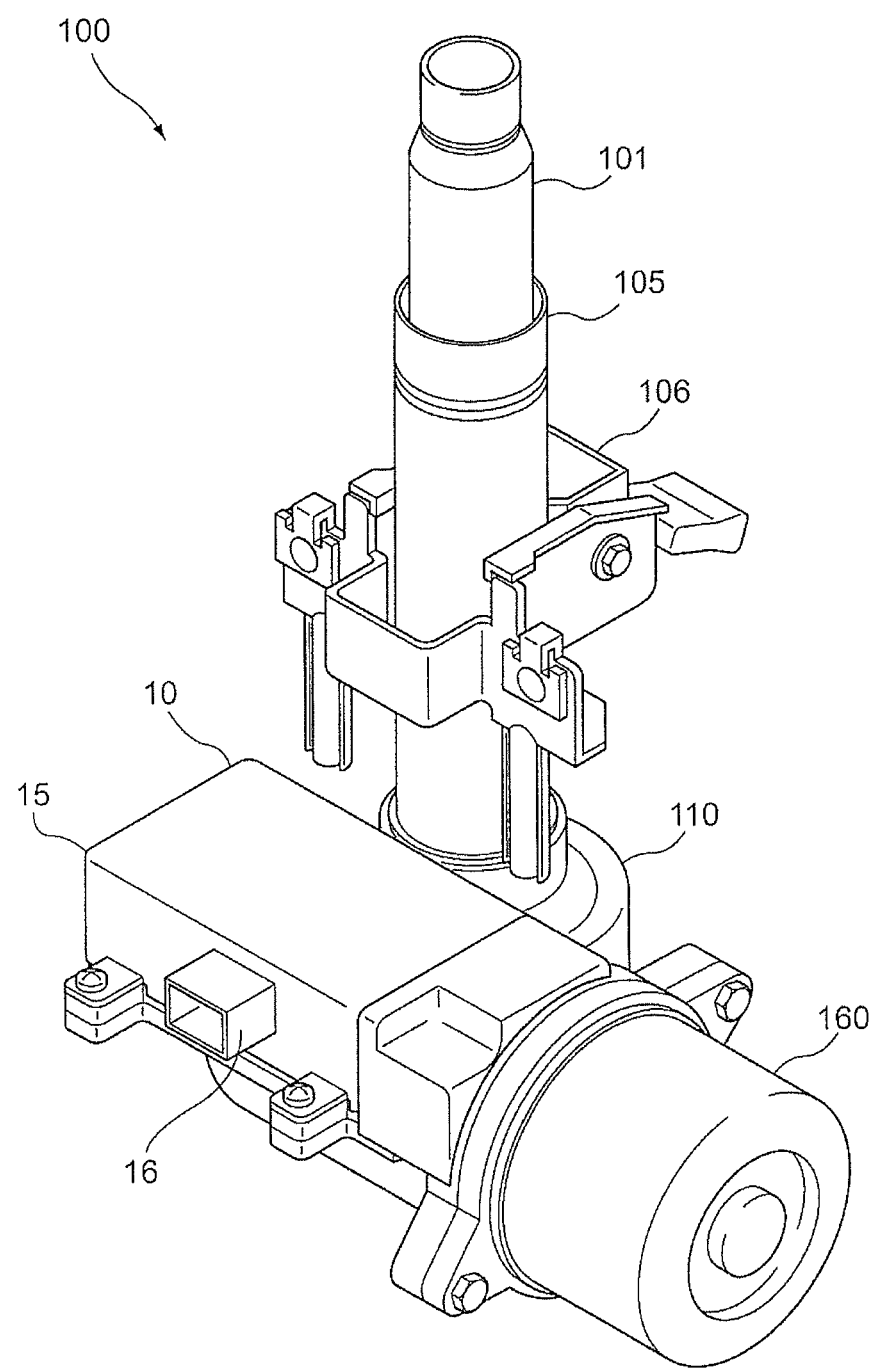
FIG. 1 is a view illustrating an exterior appearance of an electric power steering apparatus according to an embodiment.
Figure 2:
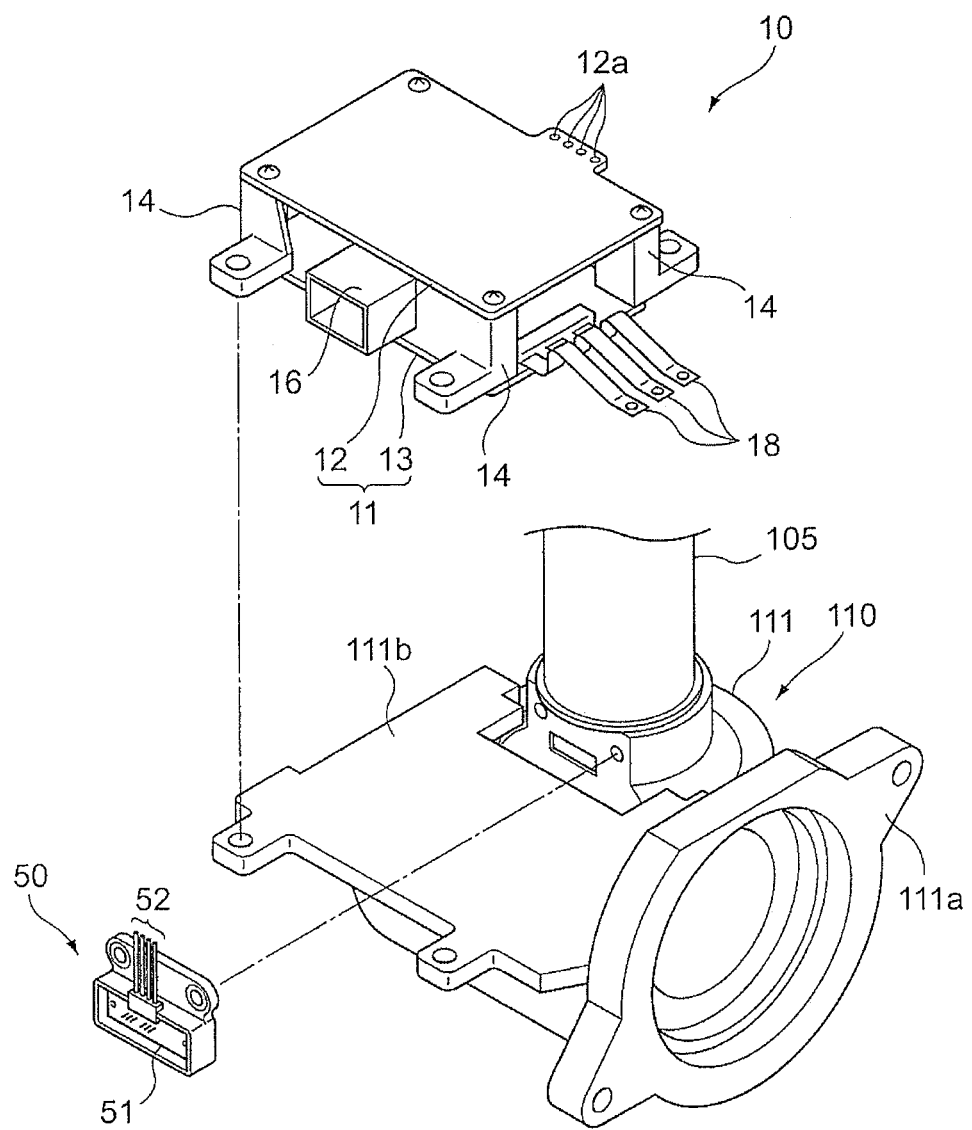
FIG. 2 is a schematic configuration view of the electric power steering apparatus.
Figure 3:
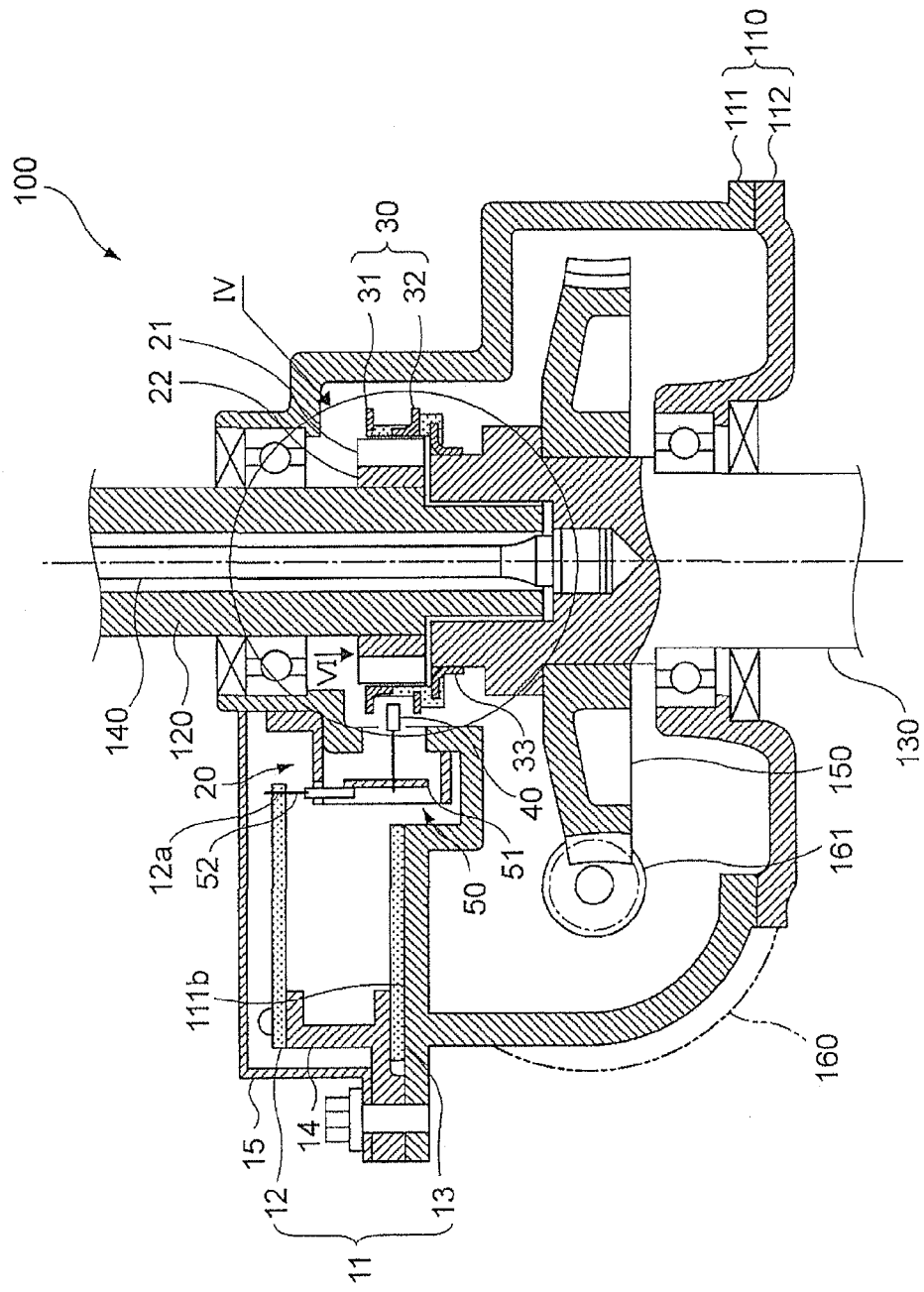
FIG. 3 is a cross-sectional view of the electric power steering apparatus.

FIG. 1 is a view illustrating an exterior appearance of an electric power steering apparatus 100 according to an embodiment. FIG. 2 is a schematic configuration view of the electric power steering apparatus 100. FIG. 3 is a cross-sectional view of the electric power steering apparatus 100. In FIG. 2, a cover 15 of an ECU 10 which will be described is not illustrated.

The electric power steering apparatus (hereinafter, referred to as a "steering apparatus") 100 according to the embodiment is a column assist apparatus. The steering apparatus 100 includes a steering shaft 101 and a steering column 105. The steering shaft 101 is connected to a steering wheel (not illustrated), and the steering column 105 covers the circumference of the steering shaft 101 in a rotation radial direction of the steering shaft 101.

The steering apparatus 100 includes a gear box 110 and a bracket 106. The gear box 110 accommodates a worm wheel 150 and a worm gear 161, which will be described later. The bracket 106 directly or indirectly fixes the steering column 105 and the gear box 110 to a main body frame of transport.

The steering apparatus 100 includes an electric motor 160; an electronic controller (hereinafter, may be referred to as an "ECU") 10; and a torque detection device 20. The electric motor 160 provides an assist force so as to supplement a steering force which a driver applies to the steering wheel. The electronic controller 10 controls an operation of the electric motor 160. The torque detection device 20 detects a steering torque T applied by the driver.

The steering shaft 101 has a first rotation shaft 120 and a second rotation shaft 130. The steering wheel (not illustrated) is connected to an upper end of the first rotation shaft 120. The second rotation shaft 130 is coaxially connected to the first rotation shaft 120 via a torsion bar 140. For example, the worm wheel 150 is fixed to the second rotation shaft 130 by using press fitting. The worm wheel 150 meshes with the worm gear 161 that is connected to an output shaft of the electric motor 160 fixed to the gear box 110.

The gear box 110 has a first member 111 and a second member 112. The first member 111 rotatably supports the first rotation shaft 120. The second member 112 rotatably supports the second rotation shaft 130, and is joined with the first member 111 by using, for example, a bolt. The first member 111 has a motor attachment portion 111*a* to which the electric motor 160 is attached, and an ECU attachment portion 111*b* to which the ECU 10 is attached.

In the steering apparatus 100 with the aforementioned configuration, the torque detection device 20 detects the steering torque T based on a relative rotation angle between the first rotation shaft 120 and the second rotation shaft 130. The ECU 10 controls the drive of the electric motor 160 based on the detected steering torque T. A rotation drive force of the electric motor 160 is transmitted to the second rotation shaft 130 via the worm gear 161 and the worm wheel 150. Accordingly, the electric motor 160 generates a torque so as to supplement a steering force which the driver applies to the steering wheel.

Subsequently, the torque detection device 20 will be described in detail.

Figure 4:
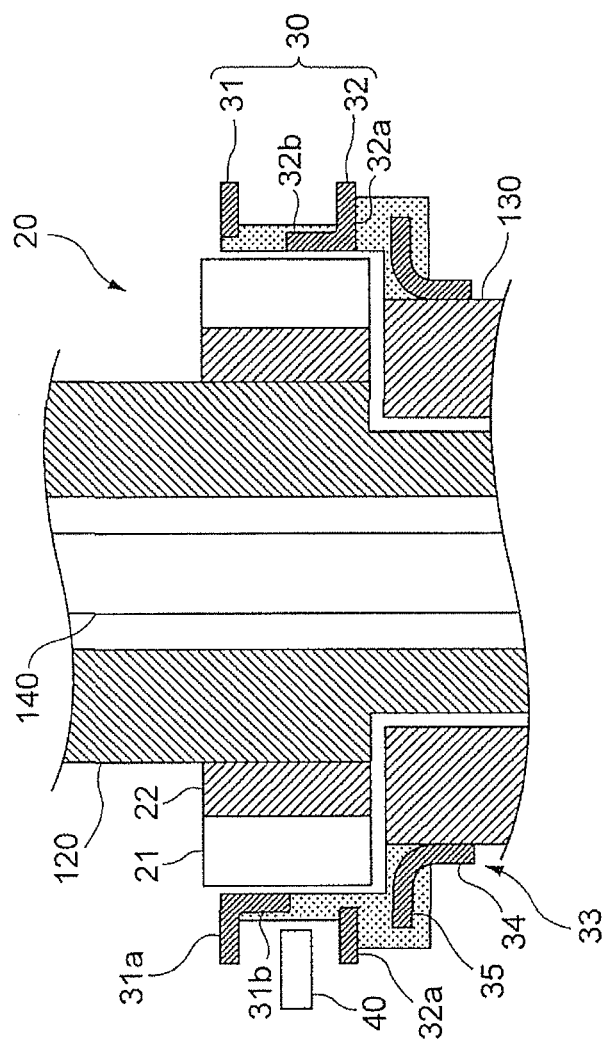
FIG. 4 is an enlarged view of portion IV in FIG. 3.
Figure 5:
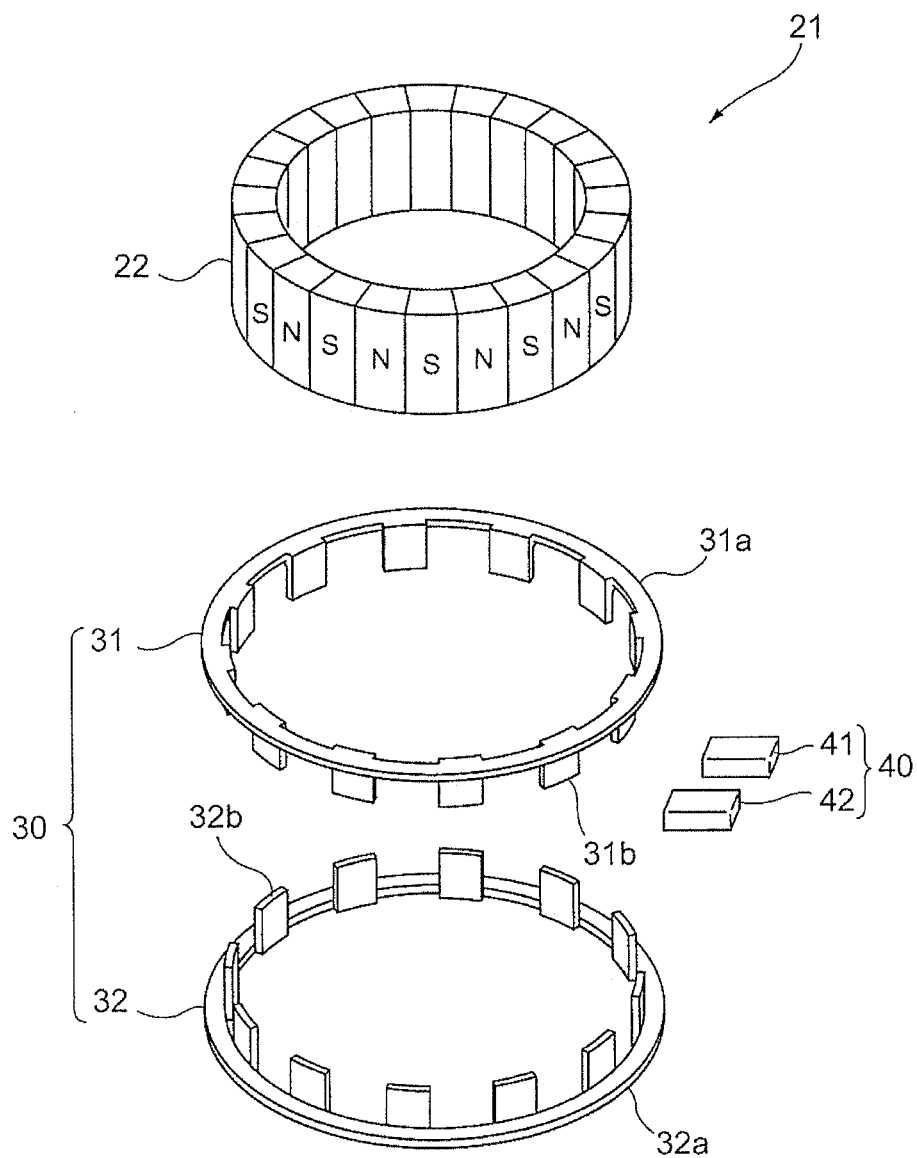
FIG. 5 is a schematic configuration view of main components of a torque detection device according to the embodiment.
Figure 6:
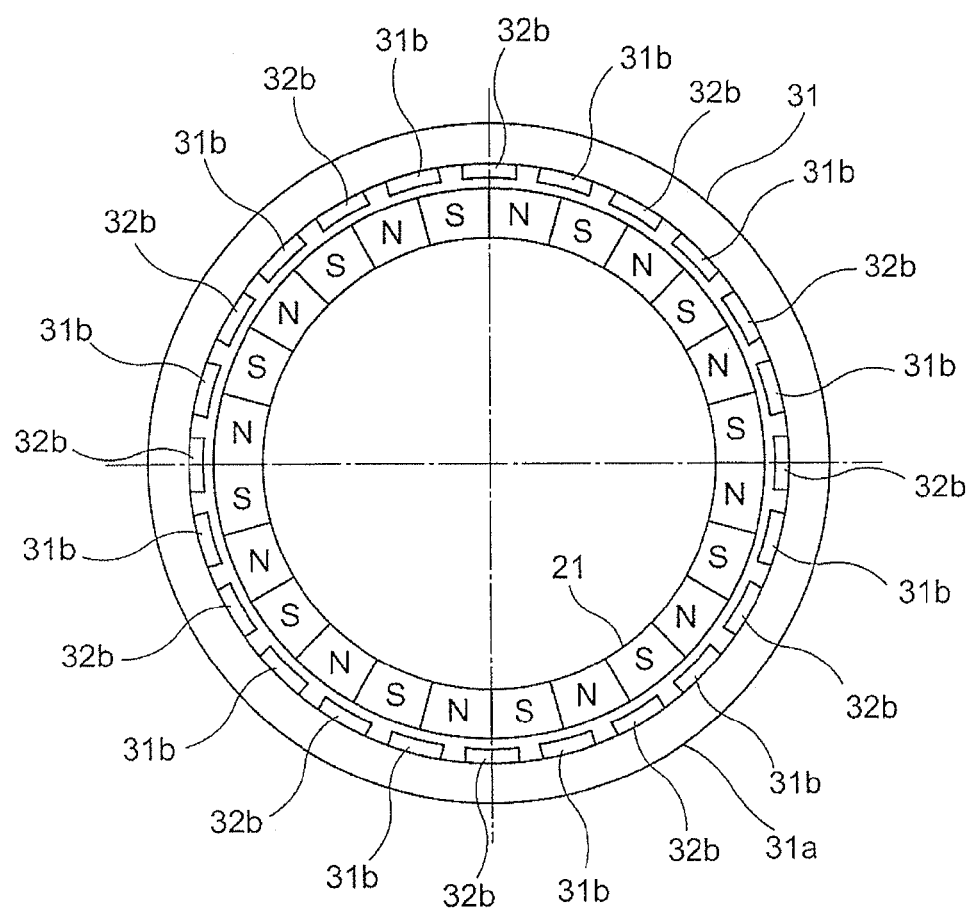
FIG. 6 is a view of a magnet and a yoke to be described later of the torque detection device when seen from direction VI in FIG. 3.

FIG. 4 is an enlarged view of portion IV in FIG. 3. FIG. 5 is a schematic configuration view of main components of the torque detection device 20 according to the embodiment. FIG. 6 is a view of a magnet 21 and a yoke 30 to be described later of the torque detection device 20 when seen from direction VI in FIG. 3. In FIG. 6, a yoke retention member 33 which will be described later is not illustrated.

The torque detection device 20 has the magnet 21 and the yoke 30. The magnet 21 is an example of a hard magnetic body, and is attached to the first rotation shaft 120. The yoke 30 as an example of a soft magnetic body is disposed in a magnetic field formed by the magnet 21, and forms a magnetic circuit along with the magnet 21. The torque detection device 20 has a magnet retention member 22 retaining the magnet 21, and the yoke retention member 33 retaining the yoke 30.

The torque detection device 20 has a magnetometric sensor 40 and a sensor unit 50. The magnetometric sensor 40 detects magnetic flux density in the magnetic circuit formed by the magnet 21 and the yoke 30. The sensor unit 50 outputs an output signal corresponding to an output value of the magnetometric sensor 40, which corresponds to a relative rotation angle between the first rotation shaft 120 and the second rotation shaft 130.

The magnet 21 has a cylindrical shape, and as illustrated in FIG. 5, N poles and S poles are alternately disposed in a circumferential direction of the first rotation shaft 120, and are magnetized in the circumferential direction. The magnet 21 is attached to the first rotation shaft 120 via the cylindrical magnet retention member 22. That is, the magnet 21 is fixed to the magnet retention member 22, and the magnet retention member 22 is fixed to the first rotation shaft 120. The magnet 21 rotates together with the first rotation shaft 120.

The yoke 30 has a first yoke 31 and a second yoke 32.

The first yoke 31 has a disc-shaped first annular portion 31a and a plurality of first protrusion portions 31b. A hole is formed on an inner side of the first annular portion 31a, and has a diameter greater than the outer diameter of the magnet 21. The first protrusion portions 31b extend from the first annular portion 31a in an axial direction (hereinafter, may be simply referred to as an "axial direction") of the first rotation shaft 120.

The second yoke 32 has a disc-shaped second annular portion 32a and a plurality of second protrusion portions 32b. A hole is formed on an inner side of the second annular portion 32a, and has a diameter greater than the outer diameter of the magnet 21. The second protrusion portions 32b extend from the second annular portion 32a in the axial direction.

The number of first protrusion portions 31b of the first yoke 31 is set to be the same as that of each of the N poles and the S poles of the magnet 21. The number of second protrusion portions 32b of the second yoke 32 is set to be the same as that of each of the N poles and the S poles of the magnet 21. That is, for example, when the magnet 21 has twelve N poles and twelve S poles, the first yoke 31 and the second yoke 32 are set to have twelve first protrusion portions 31b and twelve second protrusion portions 32b, respectively. As illustrated in FIGS. 4 and 6, the first protrusion portion 31b and the second protrusion portion 32b are disposed slightly outside of an outer circumferential surface of the magnet 21 in a rotation radial direction of the first rotation shaft 120 so as to face the outer circumferential surface of the magnet 21. Each of the first protrusion portion 31b and the second protrusion portion 32b has a surface which faces the magnet 21, and the shape of which is a rectangle when seen from a direction orthogonal to a rotation axis of the first rotation shaft 120. The first protrusion portions 31b and the second protrusion portions 32b are alternately disposed in the circumferential direction of the first rotation shaft 120.

As illustrated in FIG. 6, in the torque detection device 20 according to the embodiment, in a state where the steering torque T is not applied to the torsion bar 140, that is, in a state where the torsion bar 140 lies in a neutral state in which torsion does not occur, the magnet 21 and the first yoke 31 are disposed in such a manner that a boundary line between the N pole and the S pole of the magnet 21 is aligned with the circumferential center of the first protrusion portion 31b of the first yoke 31 when seen from a direction of clockwise rotation in the circumferential direction of the first rotation shaft 120.

As illustrated in FIG. 6, when the torsion bar 140 lies in a neutral state, the magnet 21 and the second yoke 32 are disposed in such a manner that a boundary line between the N pole and the S pole of the magnet 21 is aligned with the circumferential center of the second protrusion portion 32b of the second yoke 32 when seen from the direction of clockwise rotation in the circumferential direction of the first rotation shaft 120. When occurrence of torsion in the torsion bar 140 is caused by the application of the steering torque T to the torsion bar 140, and the first protrusion portion 31b faces one of the N pole and the S pole of the magnet 21, the second protrusion portion 32b faces the other magnetic pole with polarity different from that of the magnetic pole that the first protrusion portion 31b faces.

The yoke retention member 33 has a thin-wall cylindrical axial portion 34 and a disc-shaped radial portion 35. The axial portion 34 extends in an axial direction of the second rotation shaft 130. The radial portion 35 extends from the axial portion 34 in the rotation radial direction of the second rotation shaft 130. The axial portion 34 of the yoke retention member 33 is fixed to the second rotation shaft 130 by using press fitting, welding, caulking, or a screw. Accordingly, the yoke 30 is fixed to the second rotation shaft 130.

Figure 7:
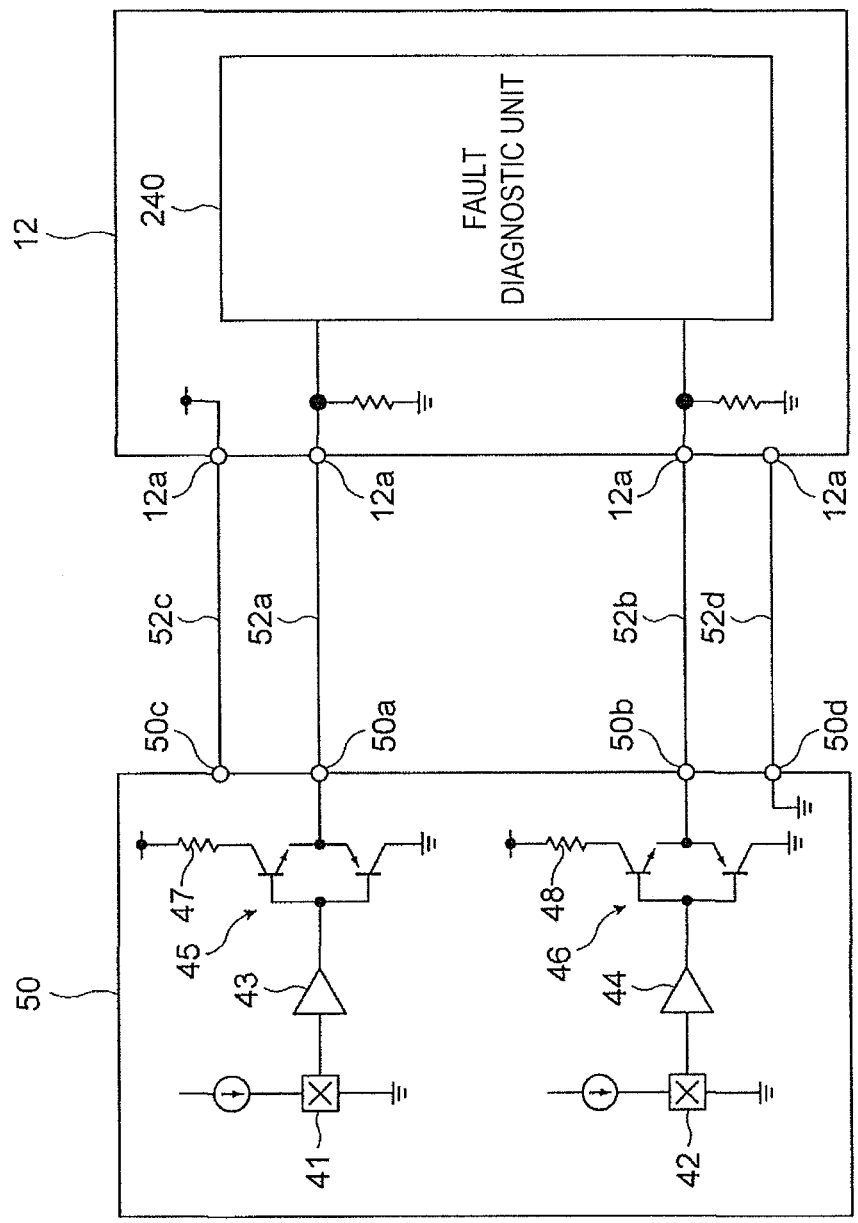
FIG. 7 is a circuit diagram of a sensor unit.

FIG. 7 is a circuit diagram of the sensor unit 50.

The magnetometric sensor 40 of the sensor unit 50 has two sensors, a first magnetometric sensor 41 and a second magnetometric sensor 42. The first magnetometric sensor 41 and the second magnetometric sensor 42 are disposed between the first annular portion 31a of the first yoke 31 and the second annular portion 32a of the second yoke 32. The first magnetometric sensor 41 and the second magnetometric sensor 42 detect magnetic flux density across the first yoke 31 and the second yoke 32, and convert the detected magnetic flux density into a voltage signal so as to output the converted voltage signal. The magnetometric sensor 40 can adopt a Hall element, or a magnetoresistive element. The first magnetometric sensor 41 and the second magnetometric sensor 42 output voltage signals which have the same value.

The sensor unit 50 has a first voltage amplifier 43; a second voltage amplifier 44; a first amplifier circuit 45; and a second amplifier circuit 46. The first voltage amplifier 43 amplifies an output voltage of the first magnetometric sensor 41, the second voltage amplifier 44 amplifies an output voltage of the second magnetometric sensor 42, the first amplifier circuit 45 amplifies an output voltage of the first voltage amplifier 43, and the second amplifier circuit 46 amplifies an output voltage of the second voltage amplifier 44. The sensor unit 50 has a first resistor 47 and a second resistor 48. The first resistor 47 is provided between the first amplifier circuit 45 and a power supply terminal 50c that receives a power supply voltage. The second resistor 48 is provided between the second amplifier circuit 46 and a power supply terminal 50c that receives a power supply voltage.

The sensor unit 50 has a substrate 51 (refer to FIG. 3) on which the magnetometric sensor 40, the first voltage amplifier 43, the second voltage amplifier 44, the first amplifier circuit 45, the second amplifier circuit 46, the first resistor 47, and the second resistor 48 are mounted. One end of each of four signal lines 52 is connected to the substrate 51 so as to connect the sensor unit 50 and the ECU 10. The other ends of the four signal lines 52 are connected to a control substrate 12 of the ECU 10, which will be described later. An output signal of the first amplifier circuit 45 is transmitted to the ECU 10 via one signal line 52a among the four signal lines 52, which is connected to a connection terminal 50a provided on the substrate 51. An output signal of the second amplifier circuit 46 is transmitted to the ECU 10 via one signal line 52b among the four signal lines 52, which is connected to a connection terminal 50b provided on the substrate 51. A power supply voltage is supplied to a power supply terminal 50c of the sensor unit 50 via one signal line 52c among the four signal lines 52. A GND voltage is supplied to a GND terminal 50d of the sensor unit 50 via other signal line 52d among the four signal lines 52.

Figure 8:
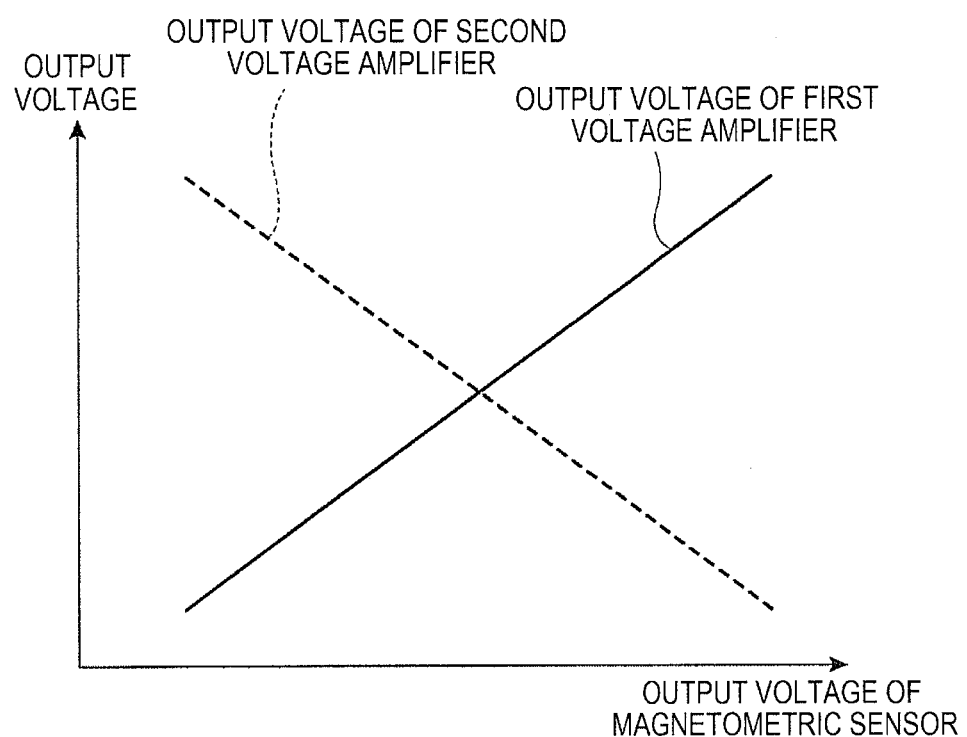
FIG. 8 is a graph illustrating respective output voltages of a first voltage amplifier and a second voltage amplifier.

FIG. 8 is a graph illustrating respective output voltages of the first voltage amplifier 43 and the second voltage amplifier 44.

The first voltage amplifier 43 and the second voltage amplifier 44 are well-known voltage amplifier circuits, and output voltage signals, respectively, which are contradictory to each other. That is, as an output voltage of the first magnetometric sensor 41 increases, the first voltage amplifier 43 outputs an increasing voltage whereas as an output voltage of the second magnetometric sensor 42 increases, the second voltage amplifier 44 outputs a decreasing voltage.

A push-pull circuit can be adopted for each of the first amplifier circuit 45 and the second amplifier circuit 46. The push-pull circuit is a circuit that is obtained by integrally combining together circuits operating reversely to each other for the output of a signal.

Figure 9:
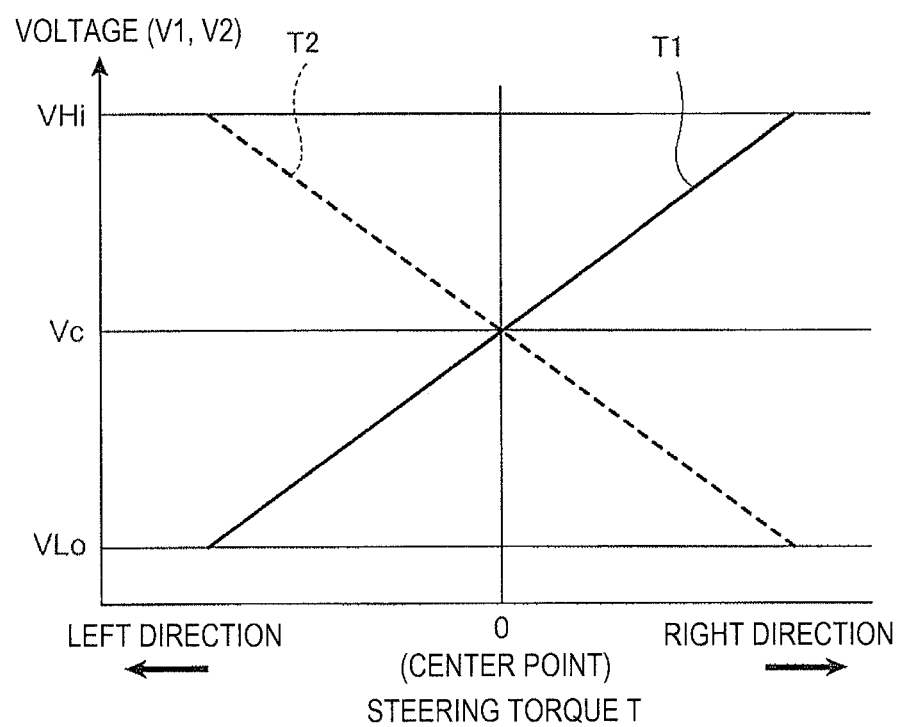
FIG. 9 is a graph illustrating a relationship among a first voltage signal output from a first amplifier circuit, a second voltage signal output from a second amplifier circuit in the sensor unit, and a steering torque T.

FIG. 9 is a view illustrating a relationship among a first voltage signal T1 output from the first amplifier circuit 45 of the sensor unit 50, a second voltage signal T2 output from the second amplifier circuit 46 of the sensor unit 50, and the steering torque T.

In FIG. 9, the horizontal axis indicates the steering torque T, and the vertical axis indicates a first voltage V1 of the first voltage signal T1, and a second voltage V2 of the second voltage signal T2. In the horizontal axis, a point, at which the steering torque T is equal to zero, is defined as the center point, or in other words, a point, at which the amount of torsion of the torsion bar 140 is equal to zero, is defined as the center point. The steering torque T on a right side of the center point indicates positive toque values, and the steering torque T on a left side of the center point indicates negative torque values.

As illustrated in FIG. 9, the sensor unit 50 with the aforementioned configuration outputs the first voltage signal T1 and the second voltage signal T2 in such a manner that the first voltage V1 indicated by the first voltage signal T1 and the second voltage V2 indicated by the second voltage signal T2 change between a maximum voltage VHi and a minimum voltage VLo.

As illustrated by the solid line in FIG. 9, the first voltage signal T1 has characteristics that the voltage of the first voltage signal T1 increases as the magnitude of the steering torque T increases along a right direction (as the torsion bar 140 increasingly rotates in a clockwise direction), the voltage of the first voltage signal T1 increases. That is, when the steering wheel rotates in the right direction, the first voltage V1 of the first voltage signal T1 increases. In contrast, as illustrated by the dotted line in FIG. 9, the second voltage V2 of the second voltage signal T2 has output characteristics (reverse output characteristics in which the second voltage V2 decreases when the first voltage V1 increases) which are contradictory to those of the first voltage signal T1, and as the magnitude of the steering torque T increases along the right direction, the second voltage V2 of the second voltage signal T2 decreases. That is, when the steering wheel rotates in the clockwise direction, the second voltage V2 of the second voltage signal T2 decreases.

At the center point, the first voltage V1 of the first voltage signal T1 is the same voltage (hereinafter, referred to as a "center point voltage Vc") as the second voltage V2 of the second voltage signal T2. For example, the center point voltage Vc is a center voltage (Vc=(VHi+VLo)/2) between the maximum voltage VHi and the minimum voltage VLo.

Furthermore, the ratio of change of the first voltage signal T1 to change of the steering torque T is the same as the ratio (an absolute value) of change of the second voltage signal T2 to change of the steering torque T. The sensor unit 50 has the output characteristics in which the sum of the first voltage V1 of the first voltage signal T1 and the second voltage V2 of the second voltage signal T2, which illustrate the same steering torque T, is the same as a predetermined voltage (2Vc) constantly.

Subsequently, the ECU 10 will be described in detail.

Figure 10:
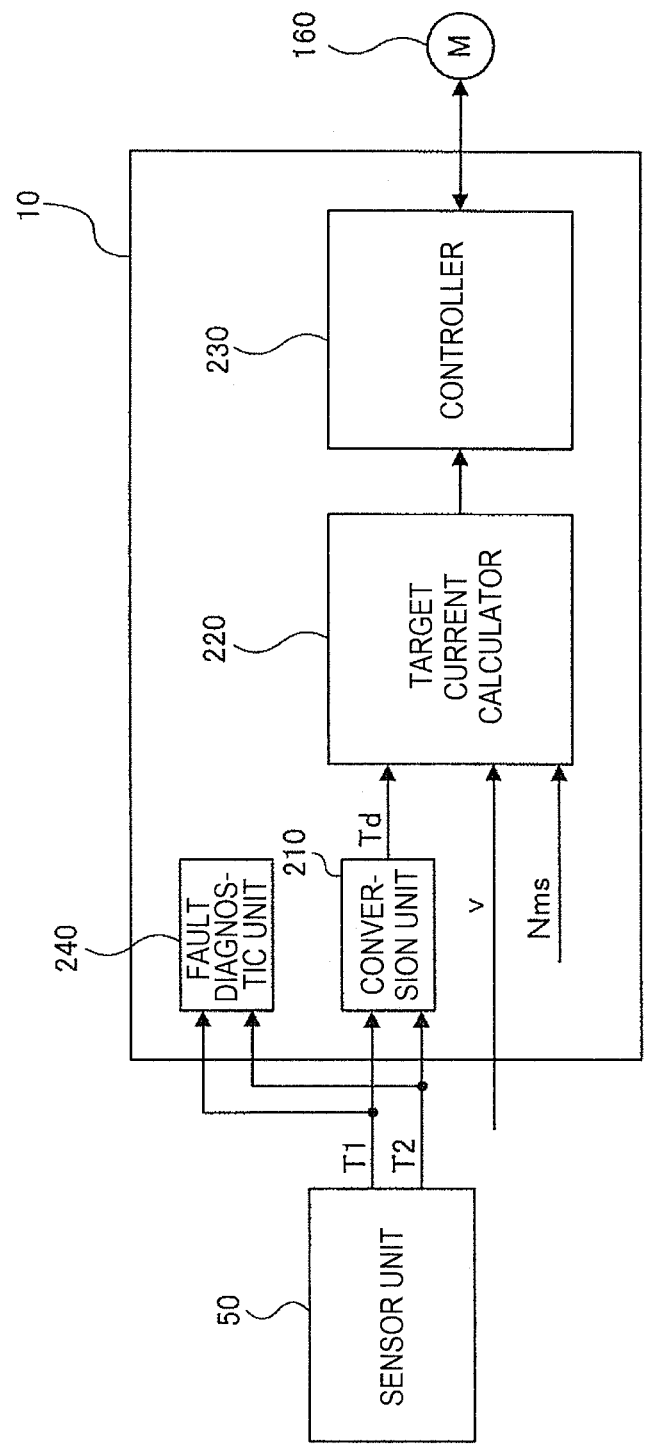
FIG. 10 is a schematic configuration diagram of an ECU of the steering apparatus.

FIG. 10 is a schematic configuration diagram of the ECU 10 of the steering apparatus 100.

The ECU 10 receives an output signal of the torque detection device 20; a vehicle speed signal V into which a vehicle speed detected by a vehicle speed sensor (not illustrated) is converted; a rotation speed signal Nms into which the rotation speed of the electric motor 160 is converted; and the like.

The ECU 10 has a conversion unit 210, a target current calculator 220, and a controller 230. The conversion unit 210 converts an output signal of the torque detection device 20 into a torque signal Td. The target current calcutator 220 calculates a target assist torque based on the torque signal Td output from the conversion unit 210, and calculates a target current to be supplied to the electric motor 160 based on the target assist torque. The controller 230 performs a feedback control based on the target current calculated by the target current calculator 220.

In addition, the ECU 10 includes a fault diagnostic unit 240 that diagnoses a fault of the torque detection device 20 based on an output signal of the torque detection device 20. The fault diagnostic unit 240 will be described in detail later.

When the torque detection device 20 is determined to have no abnormality based on the first voltage signal T1 and the second voltage signal T2 output from the torque detection device 20, the conversion unit 210 converts the first voltage signal T1 into the torque signal Td which is a digital signal corresponding to the steering torque T, and outputs the converted torque signal Td into the target current calculator 220.

The target current calculator 220 includes a base current calculator (not illustrated), an inertia compensation current calculator (not illustrated), and a damper compensation current calculator (not illustrated). The base current calculator calculates a base current which is referenced for setting of a target current. The inertia compensation current calculator calculates a current which is used to overcome the moment of inertia of the electric motor 160. The damper compensation current calculator calculates a current which is used to limit the rotation of the motor. The target current calculator 220 includes a target current determination unit (not illustrated) and a phase compensator (not illustrated). The target current determination unit determines a target current based on outputs from the base current calculator, the inertia compensation current calculator, the damper compensation current calculator, and the like. The phase compensator compensates for the phase of the torque signal Td. The target current calculator 220 calculates a target assist torque based on the torque signal Td output from the conversion unit 210, and calculates a target current to be supplied to the electric motor 160 based on the target assist torque.

The controller 230 has a motor drive controller (not illustrated), a motor drive unit (not illustrated), and a motor current detector (not illustrated). The motor drive controller controls the operation of the electric motor 160. The motor drive unit drives the electric motor 160. The motor current detector detects an actual current Im (not illustrated) that actually flows through the electric motor 160.

The motor drive controller has a feedback (FIB) controller (not illustrated) and a PWM signal generator (not illustrated). The feedback controller performs a feedback control based on a deviation between the target current which is finally determined by the target current calculator 220, and the actual current Im which is supplied to the electric motor 160 and detected by the motor current detector. The PWM signal generator generates a PWM (pulse width modulation) signal for the PWM driving of the electric motor 160.

The motor drive unit is a so-called inverter, and includes six independent transistors (FETs, and not illustrated) as switching elements. The motor drive unit controls the drive of the electric motor 160 by driving the gates of two transistors selected among the six transistors, and by enabling the transistors to undergo a switching operation.

The motor current detector detects a value of the actual current Im flowing through the electric motor 160 based on a voltage occurring across opposite ends of a shunt resistor (not illustrated) connected to the motor drive unit. The motor current detector converts the detected actual current Im into a motor current signal Ims (not illustrated) and outputs the motor current signal Ims.

An ECU substrate 11 (refer to FIGS. 2 and 3) with electronic components mounted thereon is configured to include the conversion unit 210, the target current calculator 220, the controller 230, and the fault diagnostic unit 240 of the ECU 10. The ECU substrate 11 includes the control substrate 12 and a power substrate 13 (refer to FIG. 2). A micro computer or peripherals of the micro computer, which are configured to include the conversion unit 210, the fault diagnostic unit 240, the target current calculator 220, the motor drive controller, the motor current detector, and the like, are mounted on the control substrate 12 (refer to FIG. 2). The transistors of the motor drive unit for controlling the drive of the electric motor 160 and the like are mounted on the power substrate 13 (refer to FIG. 2). An insertion hole 12a (refer to FIG. 2) is formed in the control substrate 12, and the signal line 52, which is a line for the connection to the sensor unit 50 of the torque detection device 20, is inserted into the insertion hole 12a. A motor terminal 18 is attached to the power substrate 13. The motor terminal 18 is inserted into the electric motor 160, and is electrically connected to a winding terminal (not illustrated) of the electric motor 160.

The ECU 10 includes a frame 14 (refer to FIG. 2) and a cover 15 (refer to FIG. 1). The control substrate 12 is attached to the first member 111 of the gear box 110 via the frame 14. The control substrate 12, the power substrate 13, the frame 14, and the like are covered with the cover 15.

The frame 14 has a wiring pattern which is formed of a plurality of conductive lines in insulating resin by insert molding, and is electrically connected to the control substrate 12 and the power substrate 13. A connector 16 is attached to the frame 14 (refer to FIGS. 1 and 2), and the frame 14 is connected to a battery mounted on transport such as a vehicle, networks (CANs) of various equipments mounted on the transport, and the like via the connector 16.

Subsequently, the fault diagnostic unit 240 will be described.

Figure 11:
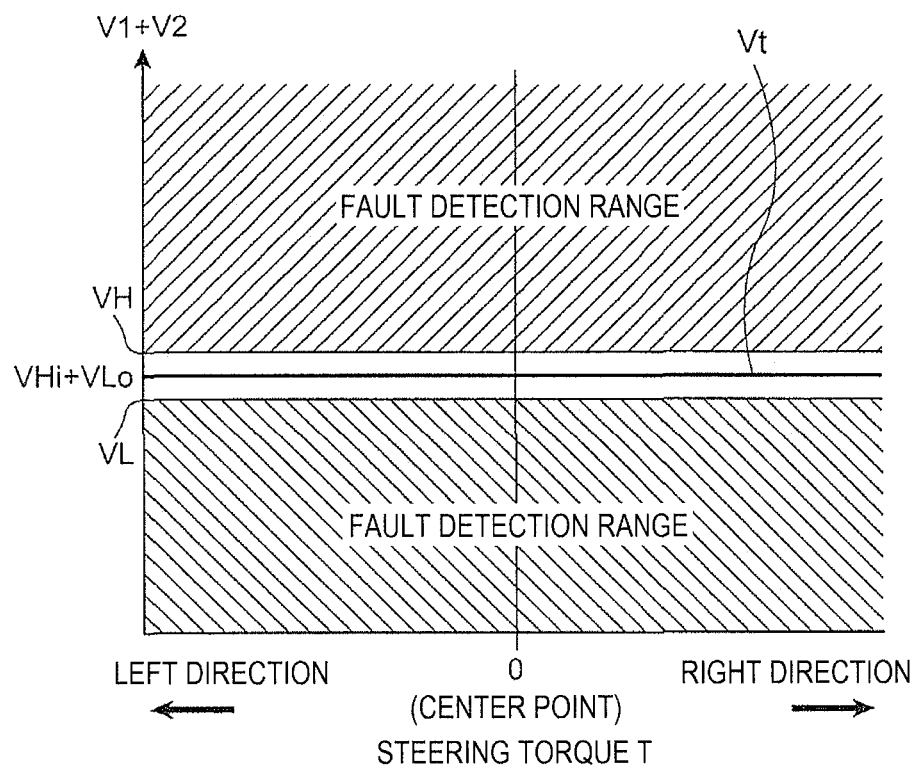
FIG. 11 is a graph illustrating a fault detection range of the torque detection device.

FIG. 11 is a graph illustrating a fault detection range of the torque detection device 20.

When a stuck-at fault occurs in the circuit of the sensor unit 50 or the like, the first voltage V1 of the first voltage signal T1 or the second voltage V2 of the second voltage signal T2 is stuck at an upper output value or a lower output value. The following signal fault abnormality may occur in the sensor unit 50: a fault that causes the first voltage V1 of the first voltage signal T1 to change to a voltage greater than a normal value; a fault that causes the first voltage V1 of the first voltage signal T1 to change to a voltage less than a normal value; a fault that causes the second voltage V2 of the second voltage signal T2 to change to a voltage greater than a normal value; and a fault that causes the second voltage V2 of the second voltage signal T2 to change to a voltage less than a normal value.

When the torque detection device 20 operates in a normal state, a sum voltage Vt, the sum of the first voltage V1 of the first voltage signal T1 and the second voltage V2 of the second voltage signal T2, becomes equal to a predetermined voltage (VHi+VLo) constantly (refer to the solid line in FIG. 11).

When signal fault abnormality occurs, or specifically, when a stuck-at fault occurs in the circuit of the sensor unit 50 or the like, for example, the first voltage V1 of the first voltage signal T1 or the second voltage V2 of the second voltage signal T2 is stuck at the upper output value, and then the first voltage V1 or the second voltage V2 changes to a voltage greater than the normal value, the sum voltage Vt becomes greater than the predetermined voltage. In contrast, when signal fault abnormality occurs, or specifically, when a stuck-at fault occurs in the circuit of the sensor unit 50 or the like, for example, the first voltage V1 or the second voltage V2 is stuck at the lower output value, and then the first voltage V1 or the second voltage V2 changes to a voltage less than the normal value, the sum voltage Vt becomes less than the predetermined voltage.

When the sum voltage Vt, the sum of the first voltage V1 of the first voltage signal T1 and the second voltage V2 of the second voltage signal T2, is different from the predetermined voltage (VHi+VLo), it is possible to determine that the torque detection device 20 has a fault. As illustrated in FIG. 11, the fluctuation of the sum voltage Vt, which is caused by an error or a pulsation occurring in the sensor unit 50, is taken into consideration, and thus a fault detection range is set to include a range in which a voltage is greater than or equal to an upper reference value VH that is greater than the predetermined voltage (VHi+VLo), and a range in which a voltage is less than or equal to a lower reference value VL that is less than the predetermined voltage (VHi+VLo). When the sum voltage Vt is in the fault detection range, the fault diagnostic unit 240 determines that the torque detection device 20 has a fault.

The fault diagnostic unit 240 determines an occurrence of fault of the torque detection device 20 based on the first voltage V1 of the first voltage signal T1 and the second voltage V2 of the second voltage signal T2. When the fault diagnostic unit 240 determines that the torque detection device 20 has a fault, the fault diagnostic unit 240 outputs to the target current calculator 220 a signal indicating that the torque detection device 20 has a fault. When the target current calculator 220 acquires the signal indicating that the torque detection device 20 has a fault, a target current being supplied to the electric motor 160 is set at zero by the target current calculator 220. When the fault diagnostic unit 240 determines that the torque detection device 20 has a fault, the fault diagnostic unit 240 turns on a warning lamp (WLP) mounted on a vehicle so as to report to a user the fact that the torque detection device 20 has a fault.

In the steering apparatus 100 according to the embodiment, the sensor unit 50 has the configuration illustrated in FIG. 7. Accordingly, even when a portion upstream of the first amplifier circuit 45 is shorted to a portion upstream of the second amplifier circuit 46, or a portion downstream of the first amplifier circuit 45 is shorted to a portion downstream of the second amplifier circuit 46, the fault diagnostic unit 240 can determine an occurrence of fault of the torque detection device 20 based on the first voltage signal T1 and the second voltage signal T2.

A case, in which the signal line 52a is shorted to the signal line 52b, is given as an example of the case in which a portion downstream of the first amplifier circuit 45 is shorted to a portion downstream of the second amplifier circuit 46.

Figure 12:
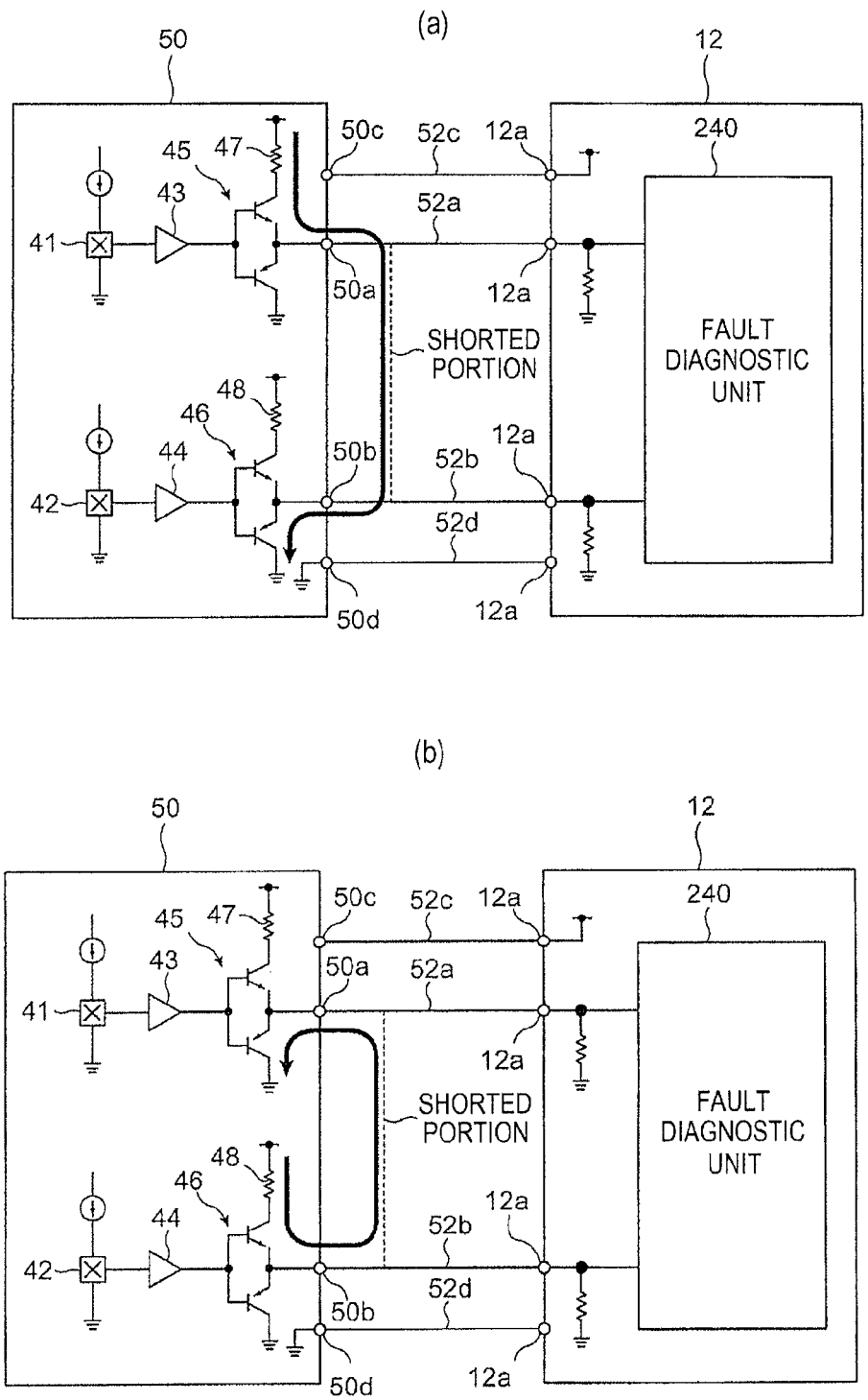
FIG. 12 shows circuit diagrams illustrating current flows when signal lines are shorted to each other, and includes Part (a) is a circuit diagram illustrating a current flow when a steering torque is positive, and Part (b) is a circuit diagram illustrating a current flow when a steering torque is negative.

FIG. 12 shows circuit diagrams showing current flows when the signal line 52a is shorted to the signal line 52b. Part (a) is a circuit diagram illustrating a current flow when the steering torque T is positive, and Part (b) is a circuit diagram illustrating a current flow when the steering torque T is negative. Part (a) of FIG. 13 is a graph illustrating the first voltage V1 of the first voltage signal T1 output from the first amplifier circuit 45, and the second voltage V2 of the second voltage signal T2 output from the second amplifier circuit 46 when the signal line 52a is shorted to the signal line 52b. Part (b) of FIG. 13 is a graph illustrating the sum voltage Vt, the sum of the first voltage V1 and the second voltage V2 when the signal line 52a is shorted to the signal line 52b.

When the steering torque T is positive, a high side transistor (a power supply terminal-side circuit) of the first amplifier circuit 45 operates, and a low side transistor (a GND terminal-side circuit) of the second amplifier circuit 46 operates. As illustrated in Part (a) of FIG. 12, a current flows through the first resistor 47 provided between the first amplifier circuit 45 and the power supply terminal 50c; the high side transistor of the first amplifier circuit 45; a shorted portion; and the low side transistor of the second amplifier circuit 46 in sequence. The first voltage V1 of the first voltage signal T1 output from the first amplifier circuit 45 becomes equal to the second voltage V2 of the second voltage signal T2 output from the second amplifier circuit 46. As illustrated in Part (a) of FIG. 13, the voltage becomes equal to the second voltage V2 of the second voltage signal T2 output from the second amplifier circuit 46 in a normal state.

When the steering torque T is negative, a high side transistor (a power supply terminal-side circuit) of the second amplifier circuit 46 operates, and a low side transistor (a GND terminal-side circuit) of the first amplifier circuit 45 operates. As illustrated in Part (b) of FIG. 12, a current flows through the second resistor 48 provided between the second amplifier circuit 46 and the power supply terminal 50c; the high side transistor of the second amplifier circuit 46; a shorted portion; and the low side transistor of the first amplifier circuit 45 in sequence. The first voltage V1 of the first voltage signal T1 output from the first amplifier circuit 45 becomes equal to the second voltage V2 of the second voltage signal T2 output from the second amplifier circuit 46. As illustrated in Part (a) of FIG. 13, the voltage becomes equal to the first voltage V1 of the first voltage signal T1 output from the first amplifier circuit 45 in a normal state.

When the signal line 52a is shorted to the signal line 52b, the sum voltage Vt, the sum of the first voltage V1 of the first voltage signal T1 output from the first amplifier circuit 45 and the second voltage V2 of the second voltage signal T2 output from the second amplifier circuit 46, becomes equal to two times the first voltage V1 or two times the second voltage V2 as illustrated in Part (b) of FIG. 13. At this time, since the sum voltage Vt is in the fault detection range, the fault diagnostic unit 240 determines that the torque detection device 20 has a fault.

In the steering apparatus 100 according to the embodiment, when a short circuit occurs in the sensor unit 50, and even when a short circuit occurs across the signal lines 52, the fault diagnostic unit 240 can determine an occurrence of a fault of the torque detection device 20 based on the first voltage signal T1 and the second voltage signal T2.

The sensor unit 50 according to the embodiment has the configuration in which the first resistor 47 is provided between the first amplifier circuit 45 and the power supply terminal 50c, the second resistor 48 is provided between the second amplifier circuit 46 and the power supply terminal 50c, and a resistor is not disposed in the signal line for transmitting an output signal of the magnetometric sensor 40. Accordingly, impedance of the signal line for transmitting an output signal of the magnetometric sensor 40 does not become large, and thus the sensor unit 50 is unlikely to be affected by noise.

Figure 14:
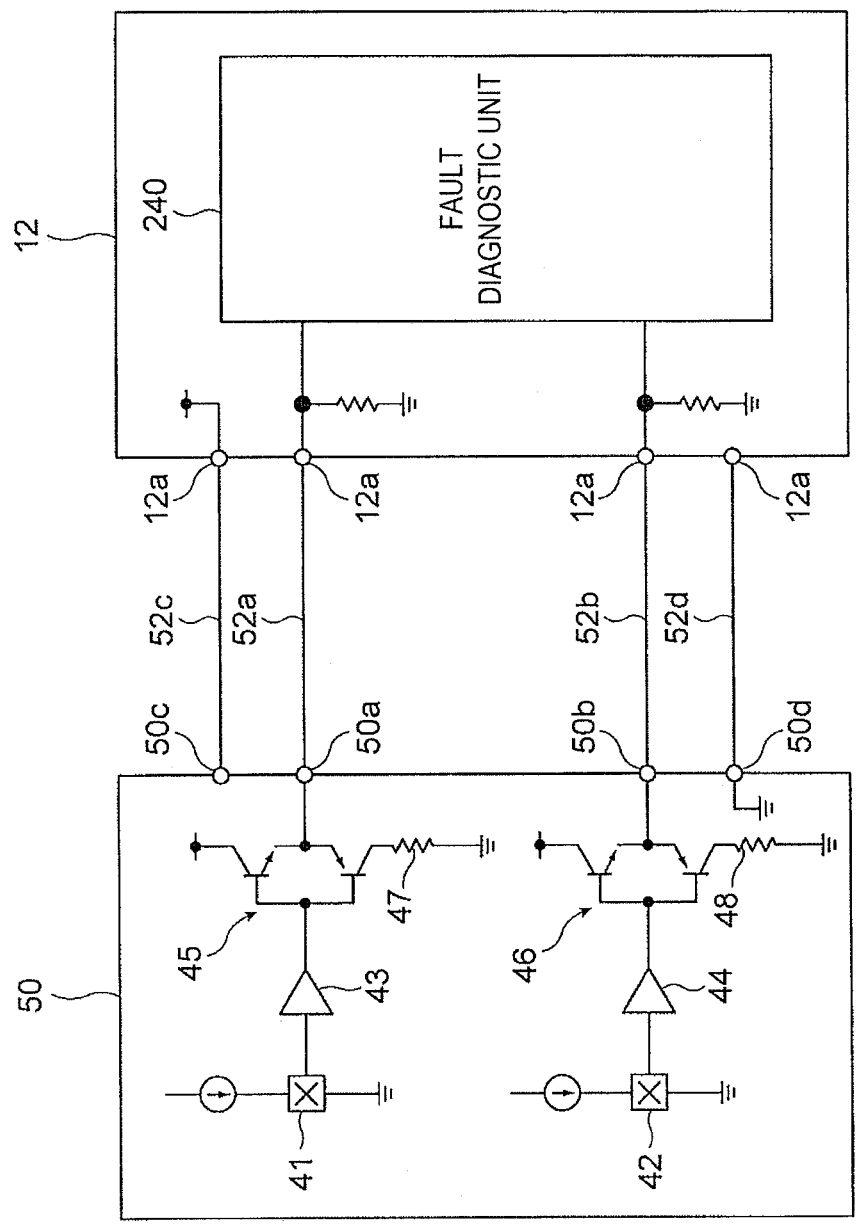
FIG. 14 is a circuit diagram of the sensor unit according to another embodiment.

FIG. 14 is a circuit diagram of the sensor unit 50 according to another embodiment.

In the circuit of the sensor unit 50 according to the other embodiment, the first resistor 47 and the second resistor 48 are respectively connected at locations different from those in the circuit diagram of the sensor unit 50 illustrated in FIG. 7. Since the other configurations are the same, only differences will be described below.

In the sensor unit 50 according to the other embodiment, the first resistor 47 is provided between the first amplifier circuit 45 and the GND terminal 50d that receives a GND voltage, and the second resistor 48 is provided between the second amplifier circuit 46 and the GND terminal 50d.

Even in the steering apparatus 100 having the sensor unit 50 with the aforementioned configuration according to the other embodiment, when a portion upstream of the first amplifier circuit 45 is shorted to a portion upstream of the second amplifier circuit 46, or a portion downstream of the first amplifier circuit 45 is shorted to a portion downstream of the second amplifier circuit 46, the fault diagnostic unit 240 can determine an occurrence of fault of the torque detection device 20 based on the first voltage signal T1 and the second voltage signal T2.

A case, in which the signal line 52a is shorted to the signal line 52b, is given as an example of the case in which a portion downstream of the first amplifier circuit 45 is shorted to a portion downstream of the second amplifier circuit 46.

FIG. 15 shows circuit diagrams illustrating current flows when the signal line 52a is shorted to the signal line 52b. Part (a) is a circuit diagram illustrating a current flow when the steering torque T is positive, and Part (b) is a circuit diagram illustrating a current flow when the steering torque T is negative. Part (a) of FIG. 16 is a graph illustrating the first voltage V1 of the first voltage signal T1 output from the first amplifier circuit 45, and the second voltage V2 of the second voltage signal T2 output from the second amplifier circuit 46 when the signal line 52a is shorted to the signal line 52b. Part (b) of FIG. 16 is a graph illustrating the sum voltage Vt, the sum of the first voltage V1 and the second voltage V2, when the signal line 52a is shorted to the signal line 52b.

When the steering torque T is positive, the high side transistor (the power supply terminal-side circuit) of the first amplifier circuit 45 operates, and the low side transistor (the GND terminal-side circuit) of the second amplifier circuit 46 operates. As illustrated in Part (a) of FIG. 15, a current flows through the high side transistor of the first amplifier circuit 45; the shorted portion; the low side transistor of the second amplifier circuit 46; and the second resistor 48 provided between the second amplifier circuit 46 and the GND terminal 50d in sequence. The first voltage V1 of the first voltage signal T1 output from the first amplifier circuit 45 becomes equal to the second voltage V2 of the second voltage signal T2 output from the second amplifier circuit 46. As illustrated in Part (a) of FIG. 16, the voltage becomes equal to the first voltage V1 of the first voltage signal T1 output from the first amplifier circuit 45 in a normal state.

When the steering torque T is negative, the high side transistor (the power supply terminal-side circuit) of the second amplifier circuit 46 operates, and the low side transistor (the GND terminal-side circuit) of the first amplifier circuit 45 operates. As illustrated in Part (b) of FIG. 15, a current flows through the high side transistor of the second amplifier circuit 46; the shorted portion; the low side transistor of the first amplifier circuit 45; and the first resistor 47 provided between the first amplifier circuit 45 and the GND terminal 50d in sequence. The first voltage V1 of the first voltage signal T1 output from the first amplifier circuit 45 becomes equal to the second voltage V2 of the second voltage signal T2 output from the second amplifier circuit 46. As illustrated in Part (a) of FIG. 16, the voltage becomes equal to the second voltage V2 of the second voltage signal T2 output from the second amplifier circuit 46 in a normal state.

When the signal line 52a is shorted to the signal line 52b, the sum voltage Vt, the sum of the first voltage V1 of the first voltage signal T1 output from the first amplifier circuit 45 and the second voltage V2 of the second voltage signal T2 output from the second amplifier circuit 46, becomes equal to two times the first voltage V1 or two times the second voltage V2 as illustrated in Part (b) of FIG. 16. At this time, since the sum voltage Vt is in the fault detection range, the fault diagnostic unit 240 determines that the torque detection device 20 has a fault.

In the steering apparatus 100 having the sensor unit 50 according to the other embodiment, when a short circuit occurs in the sensor unit 50, and even when a short circuit occurs across the signal lines 52, the fault diagnostic unit 240 can determine an occurrence of fault of the torque detection device 20 based on the first voltage signal T1 and the second voltage signal T2.

The sensor unit 50 according to the other embodiment has the configuration in which the first resistor 47 is provided between the first amplifier circuit 45 and the GND terminal 50d, the second resistor 48 is provided between the second amplifier circuit 46 and the GND terminal 50d, and a resistor is not disposed in the signal line for transmitting an output signal of the magnetometric sensor 40. Accordingly, impedance of the signal line for transmitting an output signal of the magnetometric sensor 40 does not become large, and thus the sensor unit 50 is unlikely to be affected by noise.

The sensor unit 50 illustrated in FIGS. 7 and 14 includes the first magnetometric sensor 41 and the first voltage amplifier 43 as first output means for outputting a signal corresponding to a relative rotation angle between the first rotation shaft 120 and the second rotation shaft 130. The sensor unit 50 includes the second magnetometric sensor 42 and the second voltage amplifier 44 as second output means for outputting a signal that corresponds to the relative rotation angle, and has characteristics contradictory to those of the signal output of the first output means. The first magnetometric sensor 41 and the second magnetometric sensor 42 output respective voltage signals of the same value. The first voltage amplifier 43 and the second voltage amplifier 44 output respective voltage signals which are contradictory to each other. However, the present invention is not limited to the embodiment. For example, even when the first magnetometric sensor 41 and the second magnetometric sensor 42 detect the same magnetic flux density between the first yoke 31 and the second yoke 32, the first magnetometric sensor 41 and the second magnetometric sensor 42 may output respective voltage signals which are contradictory to each other, and the first voltage amplifier 43 and the second voltage amplifier 44 may have the same voltage amplifier circuit.

The sensor unit 50 illustrated in FIGS. 7 and 14 may be configured to at least have a Hall element as the first magnetometric sensor 41; a Hall IC including the first voltage amplifier 43, the first amplifier circuit 45, and the first resistor 47; a Hall element as the second magnetometric sensor 42; and a Hall IC including the second voltage amplifier 44, the second amplifier circuit 46, and the second resistor 48.

REFERENCE SIGNS LIST

10 ECU
20 Torque detection device
21 Magnet
30 Yoke
40 Magnetometric sensor
41 First magnetometric sensor
42 Second magnetometric sensor
43 First voltage amplifier
44 Second voltage amplifier
45 First amplifier circuit
46 Second amplifier circuit
47 First resistor
48 Second resistor
50 Sensor unit
100 Electric power steering apparatus

The invention claimed is:
1. A relative angle detection apparatus comprising:
a first output unit that outputs a signal that corresponds to a relative rotation angle between two rotation shafts that are coaxially disposed;
a first amplifier circuit that is obtained by combining together circuits operating reversely to each other, and amplifies the output signal of the first output unit;
a second output unit that outputs a signal that corresponds to the relative rotation angle, and has characteristics contradictory to those of the output signal of the first output unit;
a second amplifier circuit that is obtained by combining together circuits operating reversely to each other, and amplifies the output signal of the second output unit;
an abnormality detection unit that detects an abnormality of a first signal or a second signal based on the first signal output from the first amplifier circuit and the second signal output from the second amplifier circuit;
a first resistor that is provided between the first amplifier circuit and a power supply terminal which receives a power supply voltage, or between the first amplifier circuit and a reference terminal which receives a reference voltage; and
a second resistor that is provided between the second amplifier circuit and the power supply terminal receiving a power supply voltage, or between the second amplifier circuit and the reference terminal, and at a location that corresponds to the location in which the first resistor is provided, wherein each of the first amplifier circuit and the second amplifier circuit is a push-pull circuit;

the first resistor is not disposed in a signal line that transmits an output signal of the first output unit, and the second resistor is not disposed in a signal line that transmits an output signal of the second output unit.

2. The relative angle detection apparatus according to claim 1, wherein when the sum of the value of the first signal and the value of the second signal is outside of a predetermined range, the abnormality detection unit determines an occurrence of abnormality.

3. The relative angle detection apparatus according to claim 2, wherein each of the first output unit and the second output unit has a Hall element that outputs a voltage signal corresponding to the relative rotation angle between the two rotation shafts, and a voltage amplifier circuit that amplifies the voltage signal output from the Hall element.

4. The relative angle detection apparatus according to claim 1, wherein each of the first output unit and the second output unit has a Hall element that outputs a voltage signal corresponding to the relative rotation angle between the two rotation shafts, and a voltage amplifier circuit that amplifies the voltage signal output from the Hall element.

5. The relative angle detection apparatus according to claim 1, wherein the first resistor is directly connected to the power supply terminal or the reference terminal, and the second resistor is directly connected to the power supply terminal or the reference terminal.

6. An electric power steering apparatus comprising:

a first output unit that outputs a signal that corresponds to a relative rotation angle between two rotation shafts that are coaxially disposed;

a first amplifier circuit that is obtained by combining together circuits operating reversely to each other, and amplifies the output signal of the first output unit;

a second output unit that outputs a signal that corresponds to the relative rotation angle, and has characteristics contradictory to those of the output signal of the first output unit;

a second amplifier circuit that is obtained by combining together circuits operating reversely to each other, and amplifies the output signal of the second output unit;

an abnormality detection unit that detects abnormality of a first signal or a second signal based on the first signal output from the first amplifier circuit and the second signal output from the second amplifier circuit;

a first resistor that is provided between the first amplifier circuit and a power supply terminal which receives a power supply voltage, or between the first amplifier circuit and a reference terminal which receives a reference voltage; and a second resistor that is provided between the second amplifier circuit and the power supply terminal receiving a power supply voltage, or between the second amplifier circuit and the reference terminal, and at a location that corresponds to the location in which the first resistor is provided, wherein each of the first amplifier circuit and the second amplifier circuit is a push-pull circuit;

the first resistor is not disposed in a signal line that transmits an output signal of the first output unit, and the second resistor is not disposed in a signal line that transmits an output signal of the second output unit.

* * * * *